(12) United States Patent
Li et al.

(10) Patent No.: US 12,726,031 B2
(45) Date of Patent: Sep. 1, 2026

(54) METHOD OF TRANSIENT-FREE TRANSFORMER ENERGIZATION AND BLACK START USING INVERTER BASED RESOURCES

(71) Applicant: Florida State University Research Foundation, Inc., Tallahassee, FL (US)

(72) Inventors: Yuan Li, Tallahassee, FL (US); Fang Peng, Tallahassee, FL (US)

(73) Assignee: Florida State University Research Foundation, Inc., Tallahassee, FL (US)

( * ) Notice: Subject to any disclaimer, the term of this patent is extended or adjusted under 35 U.S.C. 154(b) by 107 days.

(21) Appl. No.: 18/930,501

(22) Filed: Oct. 29, 2024

(65) Prior Publication Data

US 2025/0141231 A1 May 1, 2025

Related U.S. Application Data

(60) Provisional application No. 63/594,177, filed on Oct. 30, 2023.

(51) Int. Cl.
*H02J 3/38* (2026.01)
*H02J 101/24* (2026.01)
(Continued)

(52) U.S. Cl.
CPC ............. *H02J 3/38* (2013.01); *H02J 2101/24* (2026.01); *H02J 2101/28* (2026.01); *H02J 2101/30* (2026.01); *H02M 1/0003* (2021.05); *H02M 1/36* (2013.01); *H02M 1/40* (2013.01); *H02M 7/48* (2013.01)

(58) Field of Classification Search
CPC ....... H02M 1/0003–0041; H02M 1/36; H02M 1/40; H02M 7/42–64; H02M 7/66–98
See application file for complete search history.

(56) References Cited

U.S. PATENT DOCUMENTS

2013/0238267 A1* 9/2013 Tziouvaras ............ G01R 31/62 702/65
2015/0365005 A1* 12/2015 Panov ............... H02M 3/33584 307/24
(Continued)

FOREIGN PATENT DOCUMENTS

CN 115296520 A * 11/2022 ............... H02H 9/02

OTHER PUBLICATIONS

Z. Chen, X. Pei, L. Peng and S. Wang, "An inrush current mitigation approach of The output transformer for inverter," Mar. 15, 2015, 2015 IEEE Applied Power Electronics Conference and Exposition (APEC), Charlotte, NC, USA, 2015, pp. 2295-2300 (Year: 2015).*
(Continued)

*Primary Examiner* — Rexford N Barnie
*Assistant Examiner* — David A Shiao
(74) *Attorney, Agent, or Firm* — SALIWANCHIK, LLOYD & EISENSCHENK

(57) ABSTRACT

Systems and methods for energizing transformers with inverter-based resources (IBRs) are provided. IBRs can pick up local critical loads after blackout and ultimately support the bulk power system recovery. The transformer energization process can be achieved by controlling IBRs without any inrush current, and the duration of the process can be instant or essentially instant.

18 Claims, 5 Drawing Sheets

(a) Direct current control schematic (b) inverter current

(51) Int. Cl.

| | |
|---|---|
| *H02J 101/28* | (2026.01) |
| *H02J 101/30* | (2026.01) |
| *H02M 1/00* | (2006.01) |
| *H02M 1/36* | (2007.01) |
| *H02M 1/40* | (2007.01) |
| *H02M 7/48* | (2007.01) |

(56) References Cited

U.S. PATENT DOCUMENTS

| | | | | |
|---|---|---|---|---|
| 2017/0133838 | A1* | 5/2017 | Fotrousi | H02H 9/002 |
| 2024/0213783 | A1* | 6/2024 | Dong | H02J 3/381 |
| 2024/0275271 | A1* | 8/2024 | Chekavskyy | H02M 1/40 |

OTHER PUBLICATIONS

Z. Li, Y. Zhang, J. Pei and X. Pei, “An Inrush Current Suppression Strategy for Fast Voltage Recovery,” Dec. 15, 2021, 2021 IEEE 2nd China International Youth Conference on Electrical Engineering (CIYCEE), Chengdu, China, 2021, pp. 1-6 (Year: 2021).*

Y. -H. Chen and P. -T. Cheng, “Flux Estimation Techniques for Inrush Current Mitigation of Line-Interactive UPS Systems,” Jan. 6, 2011, in IEEE Transactions on Industry Applications, vol. 47, No. 2, pp. 901-911, Mar.-Apr. 2011 (Year: 2011).*

English machine translation of CN115296520A published Nov. 4, 2022 (Year: 2022).*

* cited by examiner (a) Direct current control schematic (b) inverter current

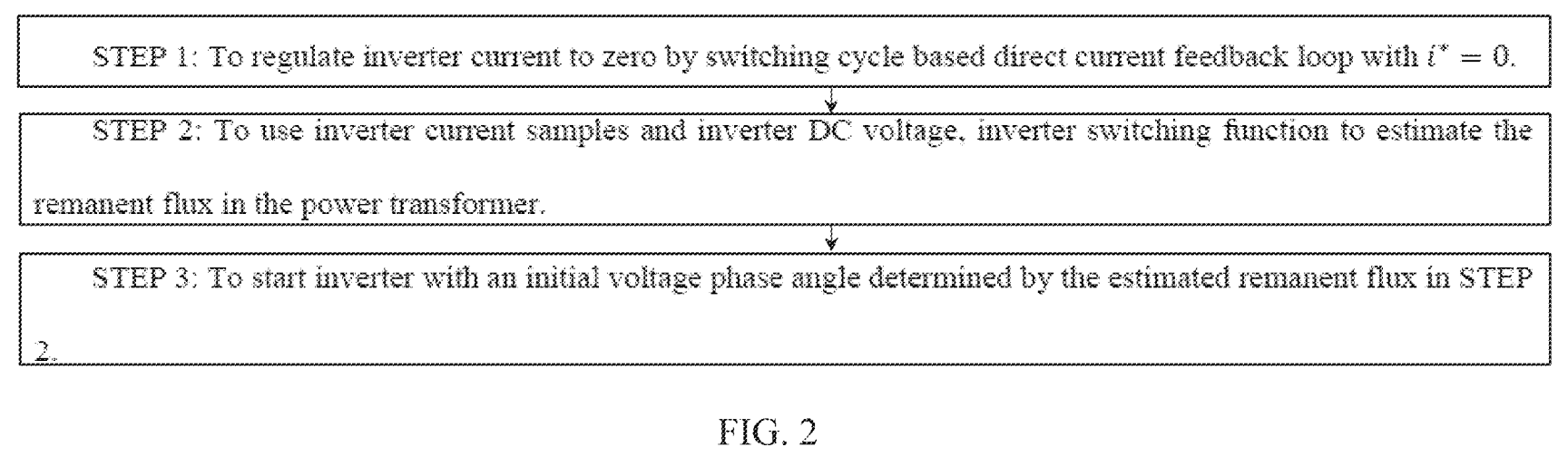

STEP 1: To regulate inverter current to zero by switching cycle based direct current feedback loop with $i^* = 0$.

STEP 2: To use inverter current samples and inverter DC voltage, inverter switching function to estimate the remanent flux in the power transformer.

STEP 3: To start inverter with an initial voltage phase angle determined by the estimated remanent flux in STEP 2.

FIG. 2

METHOD OF TRANSIENT-FREE TRANSFORMER ENERGIZATION AND BLACK START USING INVERTER BASED RESOURCES

CROSS-REFERENCE TO RELATED APPLICATION

This application claims the benefit of U.S. Provisional Application Ser. No. 63/594,177, filed Oct. 30, 2023, the disclosure of which is hereby incorporated by reference in its entirety, including all figures, tables, and drawings.

GOVERNMENT SUPPORT

This invention was made with government support under DE-EE0009340 awarded by the United States Department of Energy. The government has certain rights in the invention.

BACKGROUND

Inrush current from large power transformer energization is a major concern in the power industry. The inrush current is caused by the direct current (DC) component in the core flux (initialized from the integration of primary side voltage) and transformer saturation. The worst case is to switch in a transform (without load) at the instant when the voltage crosses zero (increasing) while the remanent flux is maximum (positive) ([1]). The magnitude of the inrush current can be as high as ten times that of the rated current for the transformer. This can result in huge mechanical and thermal stresses, in addition to triggering a cascading reaction in the power system. Transformers must be made big, heavy, and expensive to couple with the energization process. In addition, the energizing transient greatly slows down the power recovery process after blackouts.

BRIEF SUMMARY

Embodiments of the subject invention provide novel and advantageous systems and methods for energizing transformers with inverter-based resources (IBRs). IBRs can pick up local critical loads after blackout and ultimately support the bulk power system recovery. The transformer energization process can be achieved by controlling IBRs without any inrush current (or with a very small amount of inrush current, such as less than 0.1 milliamp (mA)), and the duration of the process can be instant or essentially instant (i.e., the duration of the process can be less than 100 milliseconds (ms), or even less than 10 ms).

In an embodiment, a method for energizing a transformer with IBRs can comprise: regulating a current of an inverter of the transformer to zero via a switching-cycle-based direct current (DC) feedback loop with an input current of zero; generating an estimate of a remanent flux in the transformer using samples of the current of the inverter, a DC voltage of the inverter, and an inverter switching function; determining an initial voltage phase angle of the inverter based on the estimated remanent flux in the transformer; and starting the inverter with the initial voltage phase angle. The transformer can be energized in less than 100 ms (e.g., in less than 10 ms or instantly). An inrush current of the transformer during the energizing of the transformer can be less than 100 mA (e.g., less than 10 mA, less than 1 mA, or less than 0.1 mA). The estimate of the remanent flux in the transformer can be generated using any or all of Equations 1-5 (as presented herein). The initial voltage phase angle of the inverter can be determined using any or all of Equations 6-7 (as presented herein). The regulating of the current of the inverter can comprise sampling the current of the inverter at each switching cycle and comparing the sampled inverter current with a reference value. At each switching cycle, either a first device of the inverter or a second device of the inverter can be switched, depending on whether the sampled inverter current is higher or lower than the reference value. The transformer can be connected to a solar panel, a wind turbine, a fuel cell, and/or a battery. The transformer can be connected with a power plant, a microgrid, and/or a distributed generation grid.

In another embodiment, a system for energizing a transformer with IBRs can comprise: a processor; and a machine-readable medium in operable communication with the processor and an inverter of the transformer and having instructions stored thereon that, when executed by the processor, perform a method for energizing a transformer as disclosed herein (with any individual feature or combination of features or all features of the method as disclosed herein). The system can further comprise the inverter, the transformer, and/or any other element(s) within the transformer or to which (or with which) the transformer is connected. The system can further comprise a display in operable communication with the processor, the machine-readable medium, and/or the inverter of the transformer. Any results of the steps of the method of energizing the transformer can be displayed on the display.

BRIEF DESCRIPTION OF DRAWINGS

FIG. 1(*b*) shows a plot of inverter current using the DC current control of FIG. 1(*a*).

FIG. 2 shows a flow chart of inverter DC control, according to an embodiment of the subject invention.

FIG. 5(*b*) shows a simplified system configuration of a photovoltaic (PV) plant to pick up critical loads after blackout.

DETAILED DESCRIPTION

Embodiments of the subject invention provide novel and advantageous systems and methods for energizing transformers with inverter-based resources (IBRs). IBRs can pick up local critical loads after blackout and ultimately support the bulk power system recovery. The transformer energization process can be achieved by controlling IBRs without any inrush current (or with a very small amount of inrush current, such as less than 0.1 milliamp (mA)), and the duration of the process can be instant or essentially instant (i.e., the duration of the process can be less than 100 milliseconds (ms), or even less than 10 ms).

Other methods that attempt to mitigate inrush current during transformer energization include synchronous closing of circuit breakers or insertion of series resistors, current limiter, or a series connected voltage source converter (see, e.g., references [2]-[11] from the "References" list, all of which are hereby incorporated by reference herein in their entireties). However, these methods all require additional circuit components, which are expensive, bulky, and not even feasible for high power applications. Inverters can be used to mitigate the inrush current. For example, IBRs with open-loop control can be used, but the performance of the open loop approach degrades significantly when successive grid faults occur (see, e.g., references [12]-[14] from the "References" list, all of which are hereby incorporated by reference herein in their entireties). The inrush current induced by low voltage ride through can attempt to be handled with loop control, but the transient duration based on the control can still last a few line cycles, which can interfere with other control loops (see, e.g., references [15] and [16] from the "References" list, both of which are hereby incorporated by reference herein in their entireties). High frequency operation can be applied to a large power transformer during a switching instant to reduce inrush current followed by restoration back to low frequency, but the photovoltaic (PV) system structure is a rare system, where the inverter bridge is first connected to a transformer and then to a low pass filter (see, e.g., reference [17] from the "References" list, which is hereby incorporated by reference herein in its entirety).

Figures 5A, 5B:
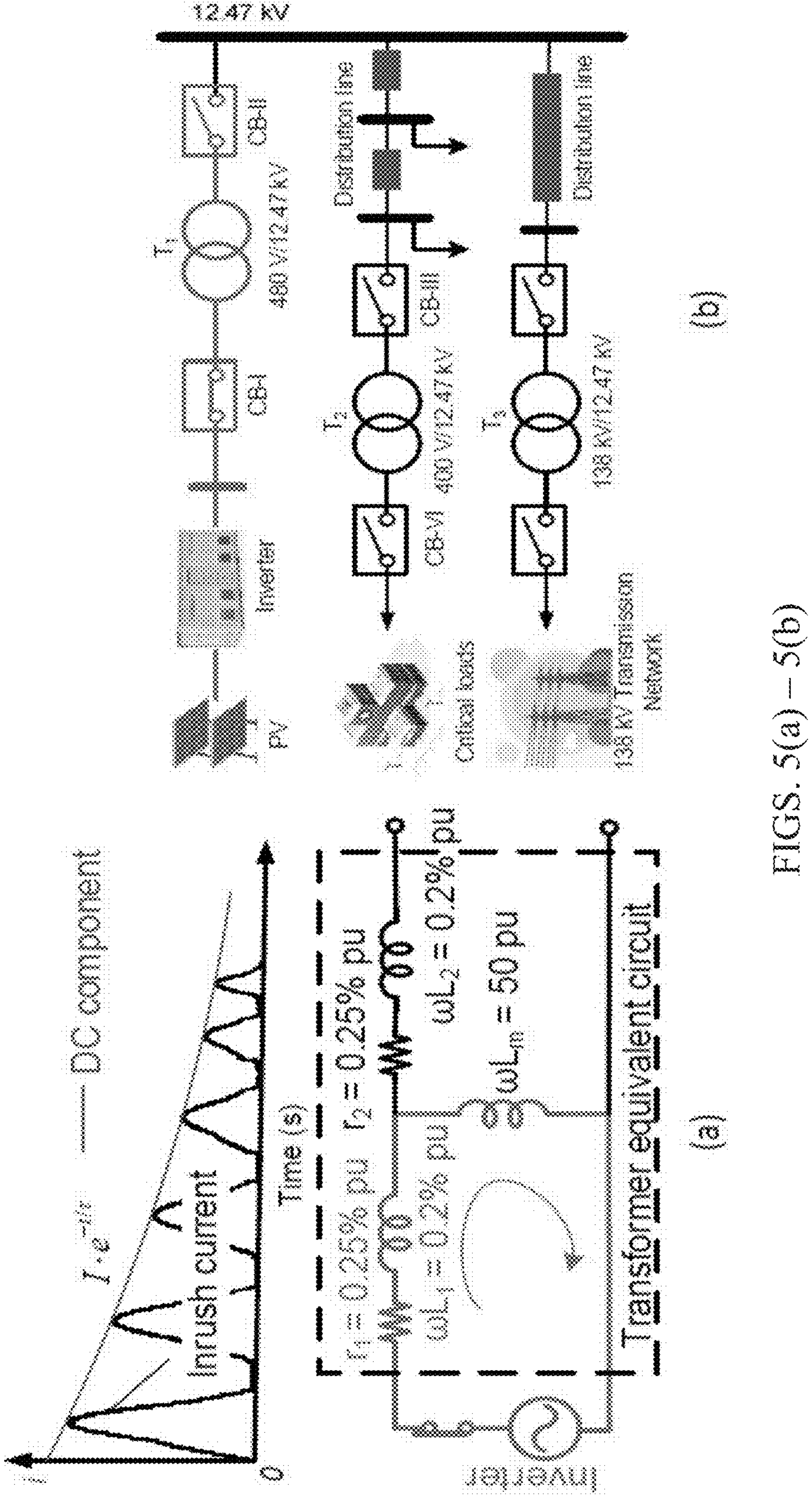
FIG. 5(*a*) shows a simplified transformer equivalent circuit for inrush current duration estimation. Inrush current when energizing large power transformer prolongs the power recovery after blackout.

The time constant for the direct current (DC) component of the inrush current to decay can be roughly estimated using a transformer equivalent circuit and typical values, as shown in FIG. 5(*a*). It is open circuit (no load) on the secondary side when energizing, so a series resistor-inductor (RL) circuit can be used to calculate the time constant. Assuming large power transformer (efficiency ($\eta$) of about 99.5%) with small resistance ($r_1 \approx r_2 = 0.25\%$ p.u.) and the exciting current is 2% of rated current ($\omega L_m \cdot 2\% \cdot I_{rated} \approx U_{rated}, \omega L_m \approx 50$ p.u.), the time constant will be $\tau = L_m / r_1 \approx 50/(0.25\% \cdot \omega) \approx 53$ seconds, where $\omega = 2\pi f = 377$ radians per second (rad/s). It indicates the DC component of the inrush current will drop to 37% after 53 seconds (t) and essentially to zero (0.7%) after 4 minutes ($5\tau$). Using a PV plant as an example as shown in FIG. 5(*b*), for transformer T1, circuit breaker II can only be closed several minutes after circuit breaker I, and so does CB-III and CB-VI for transformer T2. Counting for circuit breaker closing time, the critical loads can only be picked up at least 10-15 minutes after a power outage. It will apparently take even longer for the PV plant to reconnect to the rest of the system through transformer T3 for black start.

Embodiments of the subject invention provide a novel approach to energize a transformer by using IBRs and/or by switching cycle-based DC control. Traditional transformer energization processes induce inrush current, which can be 10 times that of the rated current for the transformer. It can take tens of seconds to several minutes for the inrush current to decay. Because of this, the power plant black start procedure is very slow. Embodiments of the subject invention mitigate the inrush current instantly or essentially (i.e., in less than 100 ms or even less than 10 ms) for a transient-free transformer energization process. Embodiments of the subject invention can advantageously use IBRs that already exist and don't need any additional circuit components. A closed-loop approach can be used, providing a feedback loop to ensure it is adaptive to any grid conditions. Further, the systems and methods of embodiments of the subject invention are based on a regular system structure in which an inverter bridge is connected to a low pass filter first, and then to the transformer.

Embodiments can provide energization of a transformer using IBR(s) by switching cycle-based DC control. Zero-inrush current can be achieved by switching cycle-based DC feedback loop with $i^*=0$. Inverter current difference over switching cycles ($\Delta i/\Delta t$) can be used to estimate the remanent flux in the power transformer. The initial inverter startup voltage phase angle can be then determined based on the remanent flux to make sure no DC component will be induced when energizing the transformer. The control method can allow the timeliest adjustment of the inverter's behavior to mitigate the inrush current and/or provide a transient free transformer energization.

Figure 1A:
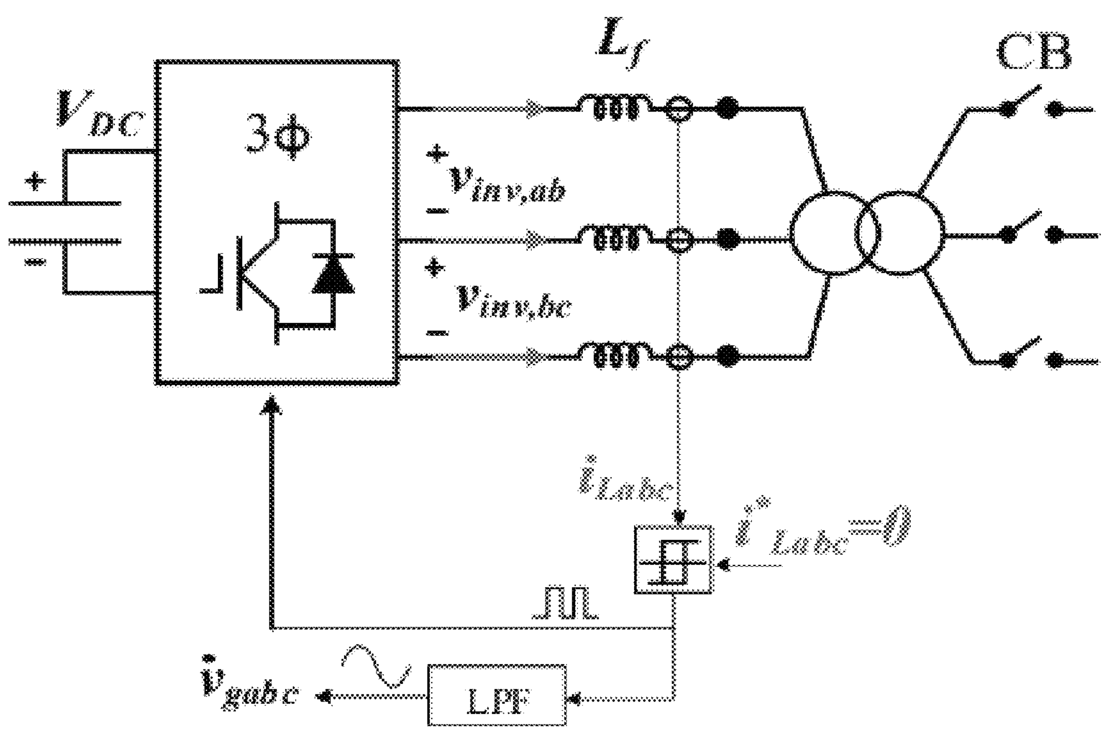
FIG. 1(*a*) shows a circuit schematic of inverter DC control, according to an embodiment of the subject invention.
Figure 1B:
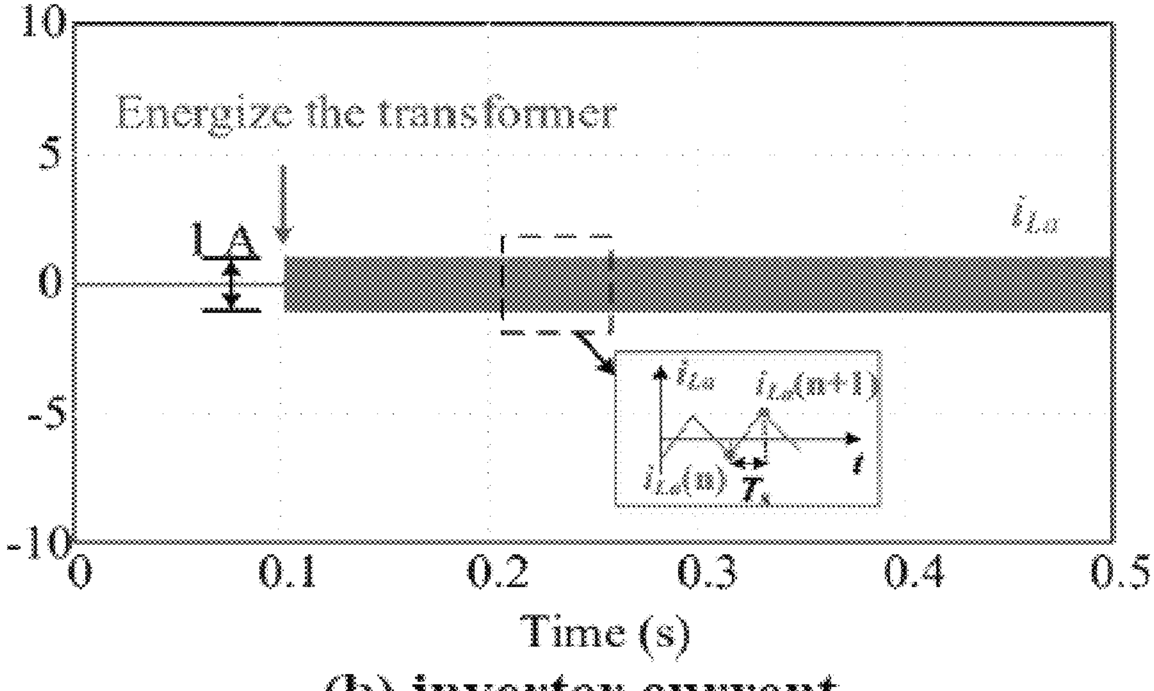

FIG. 1(*a*) shows a circuit schematic of inverter DC control, according to an embodiment of the subject invention; FIG. 1(*b*) shows a plot of inverter current using the DC current control of FIG. 1(*a*); and FIG. 2 shows a flow chart of inverter DC control, according to an embodiment of the subject invention. Referring to FIGS. 1(*a*), 1(*b*), and 2, in a first step, the inverter can be started up and the inverter current can be regulated to zero by switching cycle-based DC feedback loop with $i^*=0$. In a second step, inverter current samples, inverter DC voltage, and/or inverter switching function can be used to estimate the remanent flux in the power transformer. In a third step, the inverter can be started with the initial voltage phase angle determined by the remanent flux in the second step. The control scheme can mitigate the inrush current instantly (or essentially instantly) to provide a transient free transformer energization.

With respect to the first step (DC feedback control), a classic hysteresis current control can be used as an example to illustrate the DC feedback control, though other current regulation methods are also applicable and the classic hysteresis current control is used for exemplary purposes only. FIG. 1(*a*) shows a three-phase transformer energized by an inverter, where the pulse-width modulation (PWM) signals are generated by hysteresis current control loop with an inverter current reference of $$i_L^* = 0.$$

The inverter current $i_L$ is sampled periodically at each switching cycle ($T_s$) and compared with the reference. Depending on the error sign, either the upper or the lower devices are switched. FIG. 1(*b*) shows the current waveform in simulation, where inrush current is regulated to zero from the very beginning when the inverter is starting to switch. It is notable that there is current difference over each sampling period ($\Delta i/\Delta t$), and it can be used to estimate transformer remanent flux in the second step.

Figure 3:
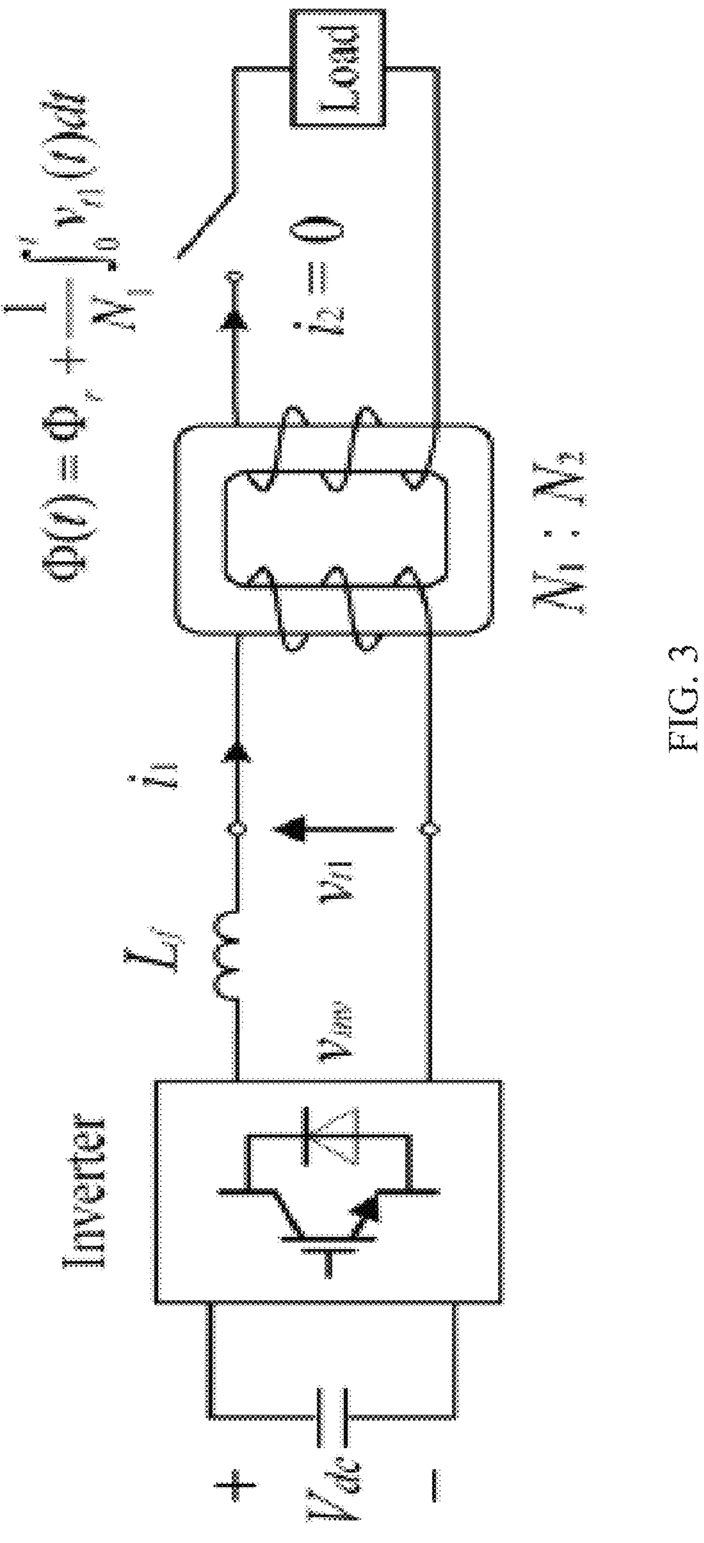
FIG. 3 shows a circuit schematic of an analytical model for a single-phase transformer energization, according to an embodiment of the subject invention.

With respect to the second step (remanent flux estimation), in order to illustrate the principle, an analytical model for a single-phase transformer energization can be established as in FIG. 3, where $v_{inv}$ and $v_{t1}$ are inverter output voltage and transformer voltage, respectively, on winding 1. Also, $i_1$ and $i_2$ are the transformer current of winding 1 and the transformer current of winding 2, respectively. The analytical model is presented for exemplary purposes only; the method is also applicable to three-phase transformers in three-phase systems. Because the winding 2 is open during the energization process, $i_2(t)=0$. Equation 1 can be established based on Ampere's law, where H(t) is the magnetic field density, $\Phi(t)$ is the core flux, and $\ell$, N1, $\mu$, and A are the length of the magnetic circuit, the number of turns on winding 1, the core permeability, and the cross-sectional area, respectively.

$$N_1 i_1(t) = H(t)\ell = \frac{\Phi(t)\cdot\ell}{\mu\cdot A} \tag{1}$$

When energizing a transformer starting from t=0, the core flux can be written as in Equation 2, where $\Phi r$ is the transformer's remanent flux that is related to the conditions prevailing at the instant of previous disconnection, and $\Phi_0$ is unknown.

$$\Phi(t) = \Phi_r + \frac{1}{N_1}\int_0^{\tau} v_{t1}(t)dt \tag{2}$$

By combining Equation 1 into Equation 2, the current on winding 1 can be obtained by Equation 3.

$$i_1(t) = \frac{\ell}{N_1\cdot\mu\cdot A}\left[\Phi_r + \frac{1}{N_1}\int_0^{\tau} v_{t1}(t)dt\right] \tag{3}$$

It can be seen from Equation 3 that it is the DC component in term $$[\Phi_r + \frac{1}{N_1}\int_0^{\tau} v_{t1}(t)dt]$$

and transformer saturation that causes $i_1(t)$ overshoot and distortion. Note that $i_1(t)$ is established by the inverter output voltage $v_{inv}=S\cdot v_{DC}$, where S is the switching function. Two current samples can be obtained from Equation 3 as shown in Equation 4.

$$\begin{cases} i_1(n) = \dfrac{\ell}{N_1\cdot\mu\cdot A}[\Phi_r + \dfrac{1}{N_1}v_{t1}(n)\cdot T_s] \\ i_1(n+1) = \dfrac{\ell}{N_1\cdot\mu\cdot A}[\Phi_r + \dfrac{1}{N_1}v_{t1}(n+1)\cdot T_s] \end{cases} \tag{4}$$

Based on Equation 4, $\Phi r$ can be solved as shown in Equation 5.

$$\Phi_r = \frac{T_s}{N_1}\cdot\frac{i_1(n+1)v_{t1}(n) - i_1(n)v_{t1}(n+1)}{i_1(n) - i_1(n+1)}, \tag{5}$$

where $\Phi r$ is the remanent flux in the transformer, $T_s$ is a time period, $N_1$ is a number of turns of a first winding of the transformer, $i_1(n)$ is a current in the first winding of the transformer in a first sampling, $i_1(n+1)$ is the current in the first winding of the transformer in a second sampling, $v_{t1}(n)$ is a voltage of the inverter in the first sampling, and $v_{t1}(n+1)$ is the voltage of the inverter in the second sampling.

Equation 5 is the equation to estimate the transformer remanent flux by current samples $i_1(n)$, $i_1(n+1)$ and inverter voltage ($v_{t1}\approx v_{inv}$) when the inverter is regulating the current to zero by DC control in Step 1. It should be noted that: 1) $v_{t1}\approx v_{inv}$ because the magnetizing inductance ($L_m$) is much larger than the inverter filter and the transformer leakage inductance; and 2) $\mu$ is linearized as a constant coefficient here because the core flux related to $i_1(n)$ and $i_1(n+1)$ would not change too much in such a short time period Ts.

With respect to the third step (determination of inverter initial phase angle), consider the inverter as a voltage source $v_{inv}=V_{t1}\cdot\sin(\omega t+\varphi_0)$ starting from an initial phase angle $\varphi_0$, where $V_{t1}$ is the magnitude of transformer nominal voltage on winding 1. Assuming there's no remanent flux existing in the transformer, then the inverter should start from $$\varphi_0 = \pm\frac{\pi}{2}$$

without introducing the DC component in the core flux. Provided $\Phi r$, the integration of inverter voltage from $\varphi_0$ to $\pi/2$ should equal $-\Phi_r$. Based on this analysis, Equation 6 can be established.

$$\frac{1}{\omega N_1}\int_{\varphi_0}^{\pi/2} V_{t1}\cdot\sin(\omega t)d(\omega t) = -\Phi_r,\ \varphi_0 \in [-\frac{\pi}{2}, \frac{\pi}{2}]. \tag{6}$$

Thus, $\varphi_0$ can be solved as shown in Equation 7.

$$\varphi_0 = \pi - \cos^{-1}\left(\frac{\Phi_r N_1 \omega}{V_{t1}}\right),\ \varphi_0 \in [-\frac{\pi}{2}, \frac{\pi}{2}], \tag{7}$$

where $\varphi_0$ is the initial voltage phase angle of the inverter, $\Phi_r$ is the remanent flux in the transformer, $N_1$ is a number of turns of a first winding of the transformer, $\omega$ is a frequency of the inverter, and $v_{r1}$ is a voltage of the inverter. The inverter can then start with a voltage reference $$v_{inv}^* = V_{t1}\cdot\sin(\omega t + \varphi_0).$$

Embodiments of the subject invention provide instant (or essentially instant) energization of power transformers with IBRs. The DC control, the principle for the remanent flux estimation, and the inverter startup voltage phase angle determination can be used for the energization. Zero inrush current (or nearly zero inrush current, such as less than 100 mA, less than 10 mA, less than 1 mA, or less than 0.1 mA), and instant (or essentially instant, such as less than 100 ms or less than 10 ms) transformer energization can be achieved. Because there are already sensors for inverter DC voltage and line current (inverter output current) measurement and protection, no extra hardware or components are needed for the systems and methods of embodiments of the subject invention. The IBR(s) can be used to actively mitigate the inrush current by DC control, which cannot be achieved by traditional synchronous machines. Inverter filters, three-phase coupling effects in the transformer, and/or potential errors in current measure could lead to challenges, but instant (or essentially instant) transformer energization by IBRs is feasible by increasing current samples and applying advanced data analysis methods.

Traditional synchronous generators are continuous voltage sources for which phase angle or frequency cannot be changed immediately. In order to mitigate the inrush current during the transformer energization process, they must rely on synchronous closing of circuit breakers or adding additional components such as current limiter or resistors. However, IBRs can be regarded as a digital voltage source whose initial phase angle can be set as any value. The DC feedback loop of systems and methods of embodiments of the subject invention enables both zero inrush current (or close to zero inrush current, such as less than 10 mA) and transformer remanent flux estimation, thereby allowing for instant (or essentially instant) transformer energization.

Embodiments of the subject invention can be used to energize power transformers in which inverters interface with energy resources, including but not limited to solar panels, wind turbines, fuel cells, and batteries. Embodiments can be utilized with power plants, microgrids, and/or distributed generation to mitigate the inrush current and instantly (or essentially instantly) energize a transformer for a fast recovery after blackouts. Embodiments of the subject invention can be implemented by commercial grid-connected inverters, such as PV inverters, battery inverters, and others, that interface renewable energy sources with transformers to a utility grid. Embodiments can enable ultra-fast black start of a power plant (such as a PV power plant, or a PV plus battery hybrid power plant, or distributed generation in microgrid) to pick up local critical loads, and ultimately to support the bulk power system recovery from blackouts.

The methods and processes described herein can be embodied as code and/or data. The software code and data described herein can be stored on one or more machine-readable media (e.g., computer-readable media), which may include any device or medium that can store code and/or data for use by a computer system. When a computer system and/or processor reads and executes the code and/or data stored on a computer-readable medium, the computer system and/or processor performs the methods and processes embodied as data structures and code stored within the computer-readable storage medium.

It should be appreciated by those skilled in the art that computer-readable media include removable and non-removable structures/devices that can be used for storage of information, such as computer-readable instructions, data structures, program modules, and other data used by a computing system/environment. A computer-readable medium includes, but is not limited to, volatile memory such as random access memories (RAM, DRAM, SRAM); and non-volatile memory such as flash memory, various read-only-memories (ROM, PROM, EPROM, EEPROM), magnetic and ferromagnetic/ferroelectric memories (MRAM, FeRAM), and magnetic and optical storage devices (hard drives, magnetic tape, CDs, DVDs); network devices; or other media now known or later developed that are capable of storing computer-readable information/data. Computer-readable media should not be construed or interpreted to include any propagating signals. A computer-readable medium of embodiments of the subject invention can be, for example, a compact disc (CD), digital video disc (DVD), flash memory device, volatile memory, or a hard disk drive (HDD), such as an external HDD or the HDD of a computing device, though embodiments are not limited thereto. A computing device can be, for example, a laptop computer, desktop computer, server, cell phone, or tablet, though embodiments are not limited thereto.

When ranges are used herein, combinations and subcombinations of ranges (including any value or subrange contained therein) are intended to be explicitly included. When the term "about" is used herein, in conjunction with a numerical value, it is understood that the value can be in a range of 95% of the value to 105% of the value, i.e. the value can be +/−5% of the stated value. For example, "about 1 kg" means from 0.95 kg to 1.05 kg.

A greater understanding of the embodiments of the subject invention and of their many advantages may be had from the following examples, given by way of illustration. The following examples are illustrative of some of the methods, applications, embodiments, and variants of the present invention. They are, of course, not to be considered as limiting the invention. Numerous changes and modifications can be made with respect to embodiments of the invention.

Example 1

Figure 4:
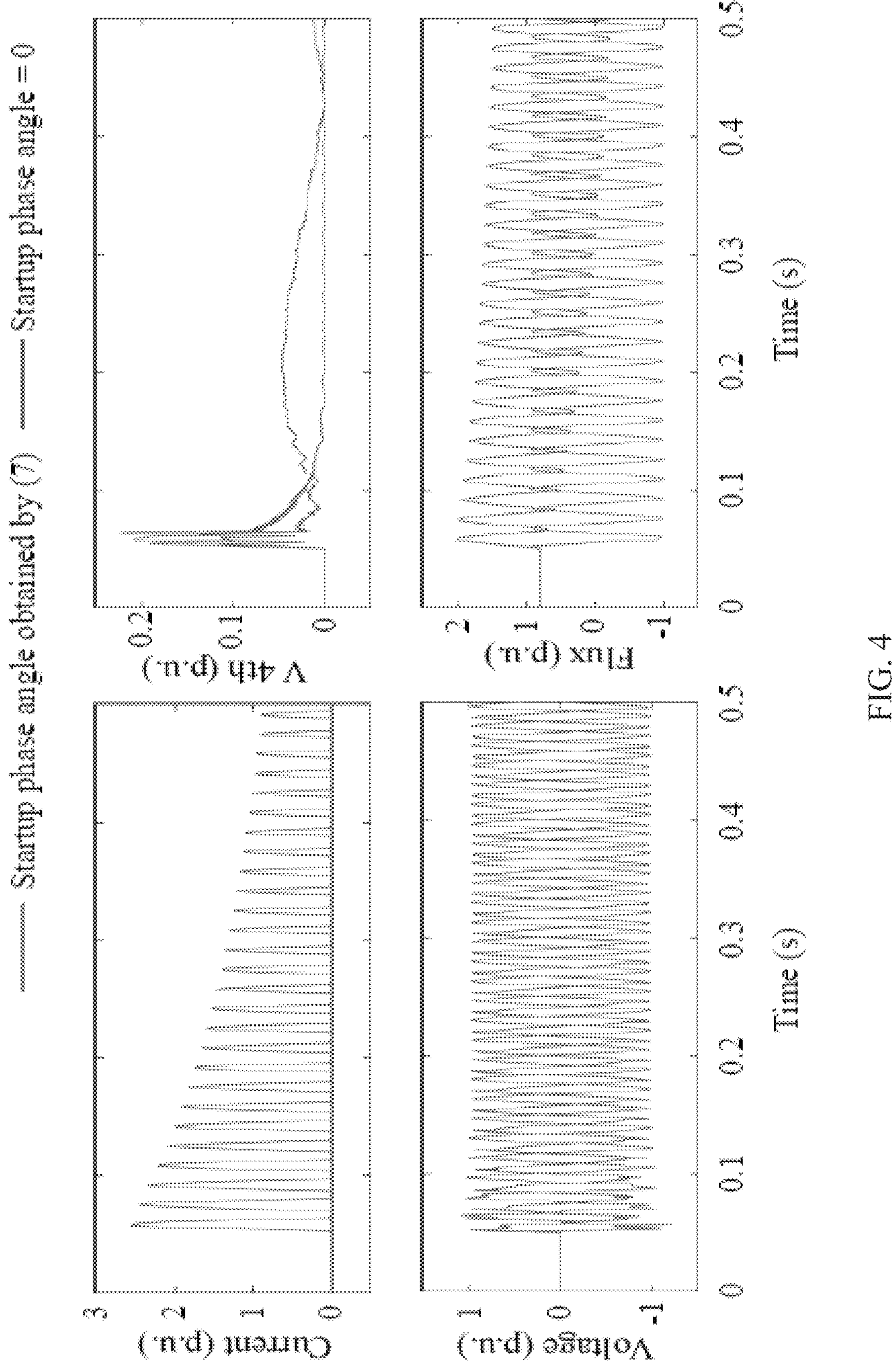
FIG. 4 shows simulation waveforms for a simulation of transformer energization. The top-left plot shows current (per unit (p.u.)) versus time (in seconds(s)); the top-right plot shows voltage to the fourth power (V4th) (p.u.) versus time (in s); the bottom-left plot shows voltage (p.u.) versus time (in s); and the bottom-right plot shows flux (p.u.) versus time (in s). In the top-left plot, the (blue) curve with the fluctuating current values is for a startup phase angle of 0, and the (orangish-brown) curve with a current value of 0 across the plot is for a startup phase angle obtained by Equation 7. In the top-right plot, the (blue) curve with the higher V4th value at a time of 0.3 s is for a startup phase angle of 0, and the (orangish-brown) curve with the lower V4th value at a time of 0.3 s is for a startup phase angle obtained by Equation 7. In the bottom-left plot, the (blue) curve with the lower voltage value at a time of 0.1 s is for a startup phase angle of 0, and the (orangish-brown) curve with the higher voltage value at a time of 0.1 s is for a startup phase angle obtained by Equation 7. In the bottom-right plot, the (blue) curve with the higher flux value at a time of 0.06 s is for a startup phase angle of 0, and the (orangish-brown) curve with the lower flux value at a time of 0.06 s is for a startup phase angle obtained by Equation 7.

A simulation was run to test the inverter DC control, according to embodiments of the subject invention, as shown in, for example, FIGS. 1(*a*), 1(*b*), and 2. FIG. 4 shows the simulation waveforms, including those for the transformer energization transient when the inverter starts from $\varphi_0=0$ rad/s at t=0.05 s (i.e., a startup phase angle of 0) and for when the inverter's initial phase angle satisfies Equation 7. Referring to FIG. 4, the inrush current during the transformer energization process can be effectively mitigated when the initial phase angle of the inverter satisfies the theoretical condition (i.e., satisfies Equation 7). The core flux does not contain any DC components during the energization process.

It should be understood that the examples and embodiments described herein are for illustrative purposes only and that various modifications or changes in light thereof will be suggested to persons skilled in the art and are to be included within the spirit and purview of this application.

All patents, patent applications, provisional applications, and publications referred to or cited herein (including in the "References" section, if present) are incorporated by reference in their entirety, including all figures and tables, to the extent they are not inconsistent with the explicit teachings of this specification.

REFERENCES

[1] K. Karsai, D. Kerényi, and L. Kiss, 1987. Large power transformers.

[2] T. R. Specht, "Transformer Inrush and Rectifier Transient Currents," in IEEE Transactions on Power Apparatus and Systems, vol. PAS-88, no. 4, pp. 269-276, April 1969, doi: 10.1109/TPAS.1969.292424.

[3] CIGRE working group task force 13.07, Controlled switching of HVAC circuit breakers, in 1st Part Elektra, no. 183, pp. 43-73, April 1999.

[4] "Controlled switching of HVAC circuit breakers," 2nd Part Elektra, no. 185, pp. 37-57, August 1999.

[5] K. Smith, L. Ran, and B. Leyman, "Analysis of transformer inrush transients in offshore electrical systems," Proc. Inst. Elect. Eng., Gen. Transm. Distrib., vol. 146, no. 1, pp. 89-95, June 1999.

[6] Yu Cui, S. G. Abdulsalam, Shiuming Chen and Wilsun Xu, "A sequential phase energization technique for transformer inrush current reduction—Part I: Simulation and experimental results," in IEEE Transactions on Power Delivery, vol. 20, no. 2, pp. 943-949, April 2005, doi: 10.1109/TPWRD.2004.843467.

[7] W. Xu, S. G. Abdulsalam, Yu Cui and Xian Liu, "A sequential phase energization technique for transformer inrush current reduction-Part II: theoretical analysis and design guide," in IEEE Transactions on Power Delivery, vol. 20, no. 2, pp. 950-957, April 2005, doi: 10.1109/TPWRD.2004.843465.

[8] G. M. Hajivar, S. Mortazavi, and M. Saniei, "The neutral grounding resistor sizing using an analytical method based on nonlinear transformer model for inrush current mitigation," in Proc. 45th Int. Univ. Power Eng. Conf. (UPEC), 2010, pp. 1-5.

[9] K. Basu and A. Asghar, "Reduction of magnetizing inrush current in a delta connected transformer," in Proc. 2nd IEEE Int. Power Energy Conf. (PECon'08), 2008, pp. 35-38.

[10] M. Abapour and M. T. haqh, "A Non-Control Transformer Inrush Current Limiter," 2006 IEEE International Conference on Industrial Technology, Mumbai, India, 2006, pp. 2390-2395, doi: 10.1109/ICIT.2006.372648.

[11] M. Wani, K. Kurundkar and M. P. Bhawalkar, "Use of power electronic converters to suppress transformer inrush current," 2012 IEEE International Conference on Power Electronics, Drives and Energy Systems (PEDES), Bengaluru, India, 2012, pp. 1-5, doi: 10.1109/PEDES.2012.6484452.

[12] Y.-H. Chen, C.-Y. Lin, J.-M. Chen and P.-T. Cheng, "An Inrush Mitigation Technique of Load Transformers for the Series Voltage Sag Compensator," in IEEE Transactions on Power Electronics, vol. 25, no. 8, pp. 2211-2221 August 2010, doi: 10.1109/TPEL.2010.2041793.

[13] Y.-H. Chen, M.-Y. Yeh, P.-T. Cheng, J.-C. Liao and W.-Y. Tsai, "An Inrush Current Reduction Technique for Multiple Inverter-Fed Transformers," in IEEE Transactions on Industry Applications, vol. 50, no. 1, pp. 474-483, January-February 2014, doi: 10.1109/TIA.2013.2269312.

[14] S.-F. Chou, C.-T. Lee, H.-C. Ko and P.-T. Cheng, "A Low-Voltage Ride-Through Method With Transformer Flux Compensation Capability of Renewable Power Grid-Side Converters," in IEEE Transactions on Power Electronics, vol. 29, no. 4, pp. 1710-1719 April 2014, doi: 10.1109/TPEL.2013.2266511.

[15] Hsin-Chih Chen, Ping-Heng Wu and P.-T. Cheng, "A transformer inrush reduction technique for low-voltage ride-through operation of renewable converters," 2014 International Power Electronics Conference (IPEC-Hiroshima 2014-ECCE ASIA), Hiroshima, Japan, 2014, pp. 1261-1267, doi: 10.1109/IPEC.2014.6869748.

[16] H.-C. Chen, P.-H. Wu and P.-T. Cheng, "A Transformer Inrush Reduction Technique for Low-Voltage Ride-Through Operation of Renewable Converters," in IEEE Transactions on Industry Applications, vol. 52, no. 3, pp. 2467-2474 May-June 2016, doi: 10.1109/TIA.2016.2533497.

[17] M. Rane and S. Wagh, "Stability enhancement of transformered PV system using inrush mitigation techniques," 2017 North American Power Symposium (NAPS), Morgantown, WV, USA, 2017, pp. 1-6, doi: 10.1109/NAPS.2017.8107388.

What is claimed is:

1. A method for energizing a transformer with inverter-based resources (IBRs), the method comprising:

regulating a current of an inverter of the transformer to zero via a switching-cycle-based direct current (DC) feedback loop with an input current of zero;

generating an estimate of a remanent flux in the transformer using samples of the current of the inverter, a DC voltage of the inverter, and an inverter switching function;

determining an initial voltage phase angle of the inverter based on the estimated remanent flux in the transformer; and starting the inverter with the initial voltage phase angle of the inverter, wherein the estimate of the remanent flux in the transformer is generated using Equation 5 as follows:

$$\Phi_r = \frac{T_s}{N_1} \cdot \frac{i_1(n+1)v_{t1}(n) - i_1(n)v_{t1}(n+1)}{i_1(n) - i_1(n+1)}, \tag{5}$$

where Φr is the estimate of the remanent flux in the transformer, $T_s$ is a time period, $N_1$ is a number of turns of a first winding of the transformer, $i_1(n)$ is a current in the first winding of the transformer in a first sampling, $i_1(n+1)$ is the current in the first winding of the transformer in a second sampling, $v_{t1}(n)$ is a voltage of the inverter in the first sampling, and $v_{t1}(n+1)$ is the voltage of the inverter in the second sampling.

2. The method according to claim 1, wherein the transformer is energized in less than 100 milliseconds (ms).

3. The method according to claim 1, wherein an inrush current of the transformer during the energizing of the transformer is less than 10 milliamps (mA).

4. The method according to claim 3, wherein an inrush current of the transformer during the energizing of the transformer is less than 0.1 mA.

5. The method according to claim 1, wherein the initial voltage phase angle of the inverter is determined using Equation 7 as follows:

$$\varphi_0 = \pi - \cos^{-1}\left(\frac{\Phi_r N_1 \omega}{V_{t1}}\right), \varphi_0 \in [-\frac{\pi}{2}, \frac{\pi}{2}], \tag{7}$$

where $\varphi_0$ is the initial voltage phase angle of the inverter, Φr is the estimate of the remanent flux in the transformer, $N_1$ is a number of turns of a first winding of the transformer, ω is a frequency of the inverter, and $v_{t1}$ is a voltage of the inverter.

6. The method according to claim 1, wherein the regulating of the current of the inverter comprises sampling the current of the inverter at each switching cycle and comparing the sampled inverter current with a reference value.

7. The method according to claim 6, wherein, at each switching cycle, either a first device of the inverter or a second device of the inverter is switched, depending on whether the sampled inverter current is higher or lower than the reference value.

8. The method according to claim 1, wherein the transformer is connected to a solar panel, a wind turbine, a fuel cell, and/or a battery.

9. The method according to claim 1, wherein the transformer is connected with a power plant, a microgrid, and/or a distributed generation grid.

10. A system for energizing a transformer with inverter-based resources (IBRs), the system comprising:

a processor; and a machine-readable medium in operable communication with the processor and an inverter of the transformer and having instructions stored thereon that, when executed by the processor, perform the following steps:

regulating a current of the inverter of the transformer to zero via a switching-cycle-based direct current (DC) feedback loop with an input current of zero;

generating an estimate of a remanent flux in the transformer using samples of the current of the inverter, a DC voltage of the inverter, and an inverter switching function;

determining an initial voltage phase angle of the inverter based on the estimated remanent flux in the transformer; and starting the inverter with the initial voltage phase angle of the inverter, wherein the estimate of the remanent flux in the transformer is generated using Equation 5 as follows:

$$\Phi_r = \frac{T_s}{N_1} \cdot \frac{i_1(n+1)v_{t1}(n) - i_1(n)v_{t1}(n+1)}{i_1(n) - i_1(n+1)}, \tag{5}$$

where Φr is the estimate of the remanent flux in the transformer, $T_s$ is a time period, $N_1$ is a number of turns of a first winding of the transformer, $i_1(n)$ is a current in the first winding of the transformer in a first sampling, $i_1(n+1)$ is the current in the first winding of the transformer in a second sampling, $v_{t1}(n)$ is a voltage of the inverter in the first sampling, and $v_{t1}(n+1)$ is the voltage of the inverter in the second sampling.

11. The system according to claim 10, wherein the transformer is energized in less than 100 milliseconds (ms).

12. The system according to claim 10, wherein an inrush current of the transformer during the energizing of the transformer is less than 10 milliamps (mA).

13. The system according to claim 12, wherein an inrush current of the transformer during the energizing of the transformer is less than 0.1 mA.

14. The system according to claim 10, wherein the initial voltage phase angle of the inverter is determined using Equation 7 as follows:

$$\varphi_0 = \pi - \cos^{-1}\left(\frac{\Phi_r N_1 \omega}{V_{t1}}\right), \varphi_0 \in [-\frac{\pi}{2}, \frac{\pi}{2}], \tag{7}$$

where $\varphi_0$ is the initial voltage phase angle of the inverter, Φr is the estimate of the remanent flux in the transformer, $N_1$ is a number of turns of a first winding of the transformer, ω is a frequency of the inverter, and $v_{t1}$ is a voltage of the inverter.

15. The system according to claim 10, wherein the regulating of the current of the inverter comprises sampling the current of the inverter at each switching cycle and comparing the sampled inverter current with a reference value.

16. The system according to claim 15, wherein, at each switching cycle, either a first device of the inverter or a second device of the inverter is switched, depending on whether the sampled inverter current is higher or lower than the reference value.

17. The system according to claim 10, wherein the transformer is connected to a solar panel, a wind turbine, a fuel cell, and/or a battery.

18. The system according to claim 10, wherein the transformer is connected with a power plant, a microgrid, and/or a distributed generation grid.

* * * * *